US009141118B2

(12) United States Patent
Yang et al.

(10) Patent No.: US 9,141,118 B2
(45) Date of Patent: Sep. 22, 2015

(54) SWITCHING CURRENT SYNTHESIS CIRCUIT FOR POWER CONVERTER

(71) Applicant: SYSTEM GENERAL CORPORATION, New Taipei (TW)

(72) Inventors: Ta-Yung Yang, Milpitas, CA (US);
Ying-Chi Chen, Taipei (TW);
Chien-Tsun Hsu, Taipei (TW);
Cheng-Sung Chen, Taichung (TW)

(73) Assignee: SYSTEM GENERAL CORPORATION, New Taipei (TW)

( * ) Notice: Subject to any disclaimer, the term of this patent is extended or adjusted under 35 U.S.C. 154(b) by 260 days.

(21) Appl. No.: 13/693,707

(22) Filed: Dec. 4, 2012

(65) Prior Publication Data

US 2013/0147452 A1   Jun. 13, 2013

Related U.S. Application Data

(60) Provisional application No. 61/567,864, filed on Dec. 7, 2011.

(51) Int. Cl.
*H02M 3/335* (2006.01)
*G05F 1/44* (2006.01)
*H02M 3/156* (2006.01)
*H02M 1/42* (2007.01)

(52) U.S. Cl.
CPC ............... *G05F 1/44* (2013.01); *H02M 1/4225* (2013.01); *H02M 3/156* (2013.01); *Y02B 70/126* (2013.01)

(58) Field of Classification Search
CPC .... H02M 3/476; H02M 3/156; Y02B 70/126; Y02B 70/16; G05F 1/10
USPC ............ 363/21.05, 21.08, 21.09, 21.1, 21.13, 363/21.16, 21.17, 21.18; 323/222, 282–288
See application file for complete search history.

(56) References Cited

U.S. PATENT DOCUMENTS

| | | | |
|---|---|---|---|
| 6,728,121 B2 * | 4/2004 | Ben-Yaakov et al. ............ | 363/89 |
| 6,958,920 B2 * | 10/2005 | Mednik et al. .................. | 363/19 |
| 7,362,592 B2 * | 4/2008 | Yang et al. .................. | 363/21.13 |
| 7,615,981 B2 * | 11/2009 | Wong et al. .................... | 323/285 |
| 2012/0212204 A1 * | 8/2012 | Philbrick et al. .............. | 323/284 |

* cited by examiner

*Primary Examiner* — Rajnikant Patel
(74) *Attorney, Agent, or Firm* — McClure, Qualey & Rodack, LLP (57) ABSTRACT

A control circuit of a power converter is provided. The control circuit comprises a PWM circuit, a sample circuit, and emulation circuit. The PWM circuit generates a switching signal for switching an inductor and generating a switching current of the inductor in response to a current feedback signal. The sample circuit is coupled to sample a switching current signal into a capacitor during an on time of the switching signal. The emulation circuit generates a discharge current couple to discharge the capacitor during an off time of the switching signal for generating the current feedback signal. The switching current signal is correlated to the switching current of the inductor, and the discharge current is generated in response to an input voltage of the inductor, an output voltage of the power converter, and the on time of the switching signal.

16 Claims, 13 Drawing Sheets

SWITCHING CURRENT SYNTHESIS CIRCUIT FOR POWER CONVERTER

CROSS REFERENCE TO RELATED APPLICATIONS

This application claims the benefit of U.S. Provisional Application No. 61/567,864, filed on Dec. 7, 2011, the contents of which are incorporated herein by reference.

BACKGROUND OF THE INVENTION

1. Field of the Invention

The invention relates to a switching current synthesis circuit, and more particularly to a switching current synthesis circuit for a power converter operating in a continuous current mode (CCM) and a discontinuous current mode (DCM).

2. Description of the Related Art

Figure 1:
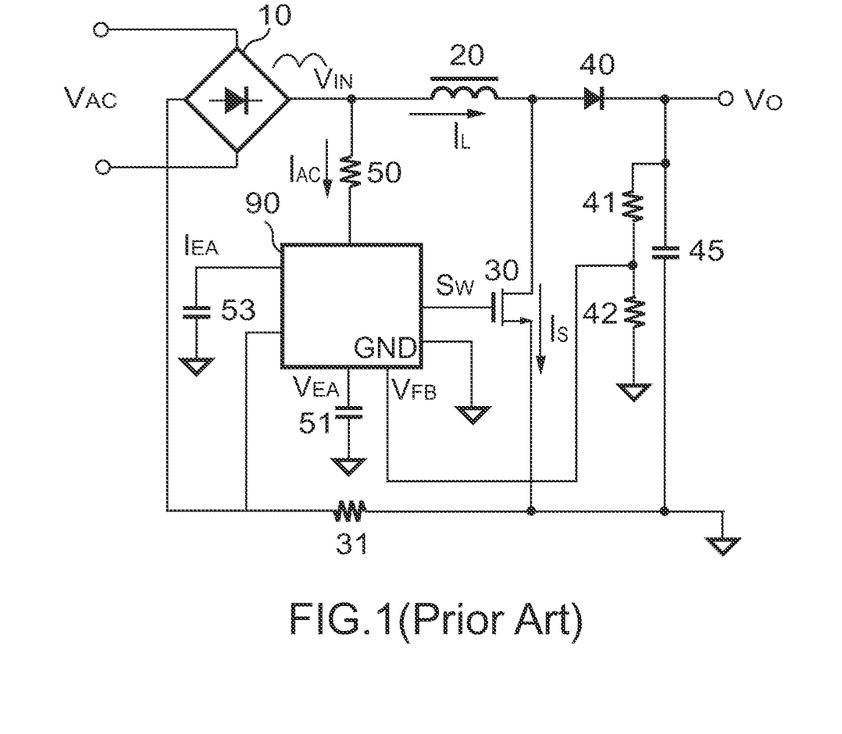
FIG. 1 shows a prior art of a PFC power converter.

A power factor correction (PFC) power converter is a good example for illustrating the present invention. FIG. 1 shows a prior art of a PFC power converter. It includes a resistor 31 coupled to sense a switching current $I_L$ of an inductor 20. The resistor 31 is coupled in the charging and discharging path of the inductor 20. The current flowing through the resistor 31 is an average value of the switching current $I_L$. Therefore, the circuit scheme shown in the FIG. 1 is called as "average-current control". The drawback of the average-current control scheme has higher power consumption in the resistor 31. Furthermore, it cannot be applied to the parallel topologies for high efficiency power conversion, such as the solution shown in the prior art, such as U.S. Pat. No. 7,626,372 titled "Control circuit for multi-phase, multi-channels PFC power converter with variable switching frequency" and U.S. Pat. No. 7,944,721 titled "Switching control circuit for multi-channels and multi-phases power converter operated at continuous current mode".

BRIEF SUMMARY OF THE INVENTION

An exemplary embodiment of a control circuit of a power converter is provided. The control circuit comprises a PWM circuit, a sample circuit, and emulation circuit. The PWM circuit generates a switching signal for switching an inductor and generating a switching current of the inductor in response to a current feedback signal. The sample circuit is coupled to sample a switching current signal into a capacitor during an on time of the switching signal. The emulation circuit generates a discharge current couple to discharge the capacitor during an off time of the switching signal for generating the current feedback signal. The switching current signal is correlated to the switching current of the inductor, and the discharge current is generated in response to an input voltage of the inductor, an output voltage of the power converter, and the on time of the switching signal.

An exemplary embodiment of a method for controlling a power converter is provided. The method comprises steps of generating a switching signal for switching an inductor and generating a switching current of the inductor in response to a current feedback signal; sampling a switching current signal into a capacitor during an on time of the switching signal; generating a discharge current to discharge the capacitor during an off time of the switching signal for generating an emulated switching current signal. The switching current signal is correlated to the switching current of the inductor, the discharge current is generated in response to an input voltage of the inductor, an output voltage of the power converter, and the on time of the switching signal, and the emulated switching current signal is coupled to generate the current feedback signal.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
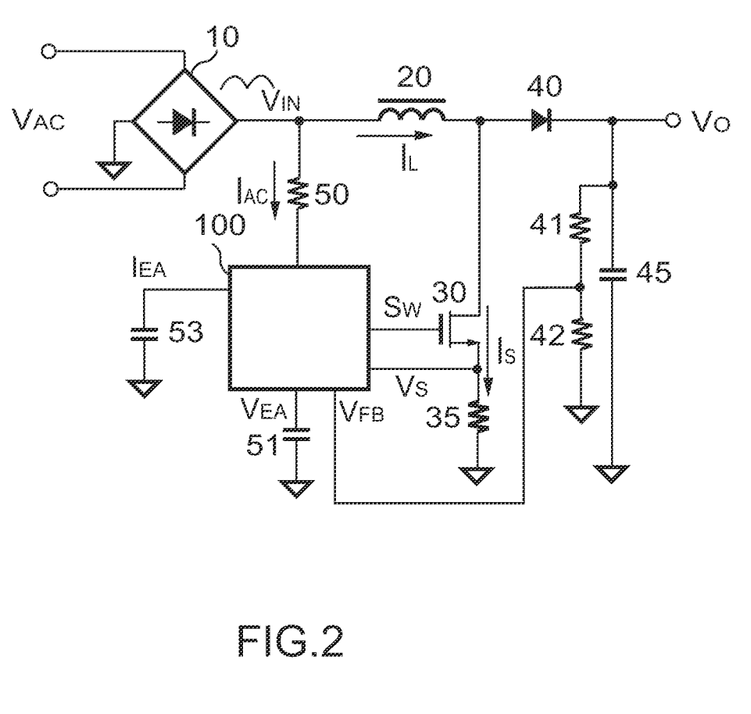
FIG. 2 shows an exemplary embodiment of a PFC power converter.

FIG. 2 shows an exemplary embodiment of a power factor correction (PFC) power converter. As shown in FIG. 2, the PFC power converter comprises a current sense resistor 35 coupled to sample a switching current $I_L$ of an inductor 20 and generate a switching current signal $V_S$ coupled to a PFC control circuit 100. According to the switching current signal $V_S$, the FPC control circuit 100 will generate a switching signal $S_W$ to switch the inductor 20 and generate the switching current $I_L$ via a power transistor 30. The switching current $I_L$ further generate the switching current signal $V_S$ at the resistor 35, which develops a close current loop for the PFC control. A capacitor 53 is used for frequency compensation of the current loop. A resistor 50 is coupled to detect an input voltage $V_{IN}$ of the inductor 20 and generate an input-voltage signal $I_{AC}$ coupled to the PFC control circuit 100. The input voltage $V_{IN}$ is obtained from an alternating current (AC)

mains $V_{AC}$ through a bridge rectifier 10. The switching current $I_L$ of the inductor 20 is discharged to an output capacitor 45 via a rectifier 40 to generate an output voltage $V_O$. Resistors 41 and 22 form a voltage divider coupled to the output of the PFC power converter to detect the output voltage $V_O$ and generate a signal $V_{FB}$ coupled to the PFC control circuit 100 for regulating of the output voltage $V_O$. The signals $V_{FB}$, $S_W$, and the output voltage $V_O$ develop a voltage loop for the PFC control. A capacitor 51 is used for frequency compensation of the voltage loop. The current sense resistor 35 can only detect the charge signal of the switching current $I_L$ during on time of the power transistor 30. The object of this invention is to emulate the discharge signal of the switching current $I_L$ and provide an accurate synthesis for the switching current signal $V_S$ during the off time of the power transistor 30. Because the inductance of the inductor 20 is changed in response to the change of the operating temperature and the change of the switching current $I_L$, the synthesis discharge signal must be correlated to the charge signal of the switching current $I_L$.

Figure 2A:
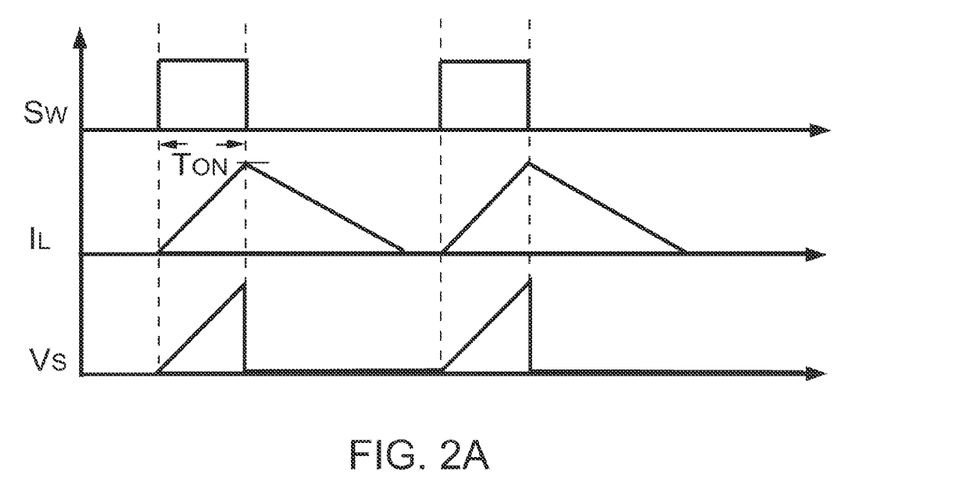
FIG. 2A shows discontinuous current mode (DCM) waveforms of a switching signal, a switching current, and a switching current signal of the PFC power converter in FIG. 2.
Figure 2B:
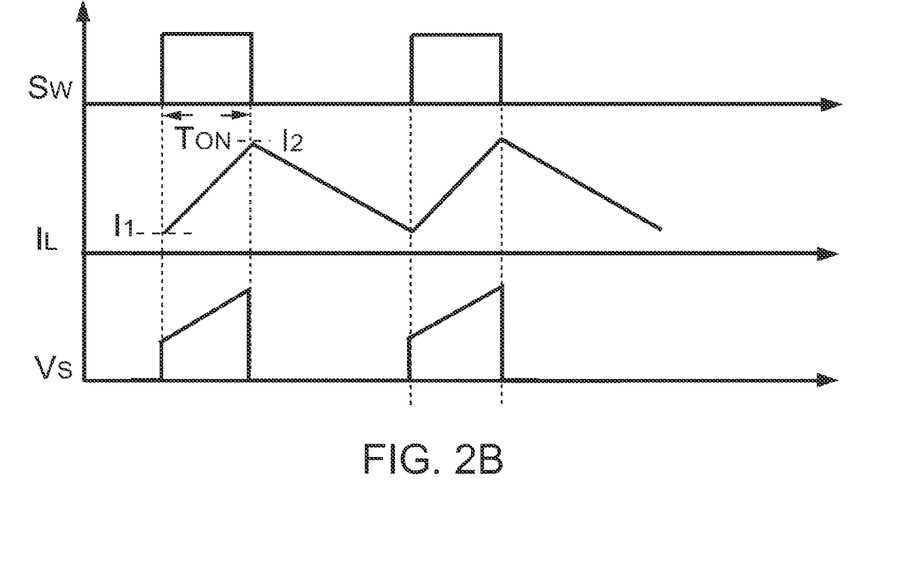
FIG. 2B shows continuous current mode (CCM) waveforms of a switching signal, a switching current, and a switching current signal of the PFC power converter in FIG. 2.

FIG. 2A shows discontinuous current mode (DCM) waveforms of the switching signal $S_W$, the switching current $I_L$, and the switching current signal $V_S$. The switching current $I_L$ of the inductor 20 is fully discharged before the start of the next switching cycle. FIG. 2B shows continuous current mode (CCM) waveforms of the switching signal $S_W$, the switching current $I_L$, and the switching current signal $V_S$. The switching current $I_L$ of the inductor 20 still has a current $I_1$ existed in the inductor 20 before the start of the next switching cycle. The slope of the charge signal (charge current) of the switching current $I_L$ is equal to the slope of the discharge signal (discharge current) of the switching current $I_L$, which can be expressed as:

$$\frac{V_{IN}}{L} \times T_{ON} = \frac{V_O - V_{IN}}{L} \times T_{DS} \quad (1)$$

$$\left(\frac{V_{IN}}{L} \times T_{ON}\right) + I_1 = \left(\frac{V_O - V_{IN}}{L} \times T_{DS}\right) + I_1 \quad (2)$$

where L is the inductance of the inductor 20. $T_{ON}$ is the on time of the switching signal $S_W$, also shown in FIGS. 2A and 2B. $T_{DS}$ is the discharge time of the inductor 20.

Equation (1) shows the switching current $I_L$ operated in a DCM, wherein $T_{OFF} > T_{DS}$, and $T_{OFF}$ is the off time of the switching signal $S_W$. Equation (2) shows the switching current $I_L$ operated in a CCM, wherein $T_{DS} > T_{OFF}$. Therefore, the current $I_1$ is still existed in the inductor 20 when the next switching signal $S_W$ starts.

Figure 3:
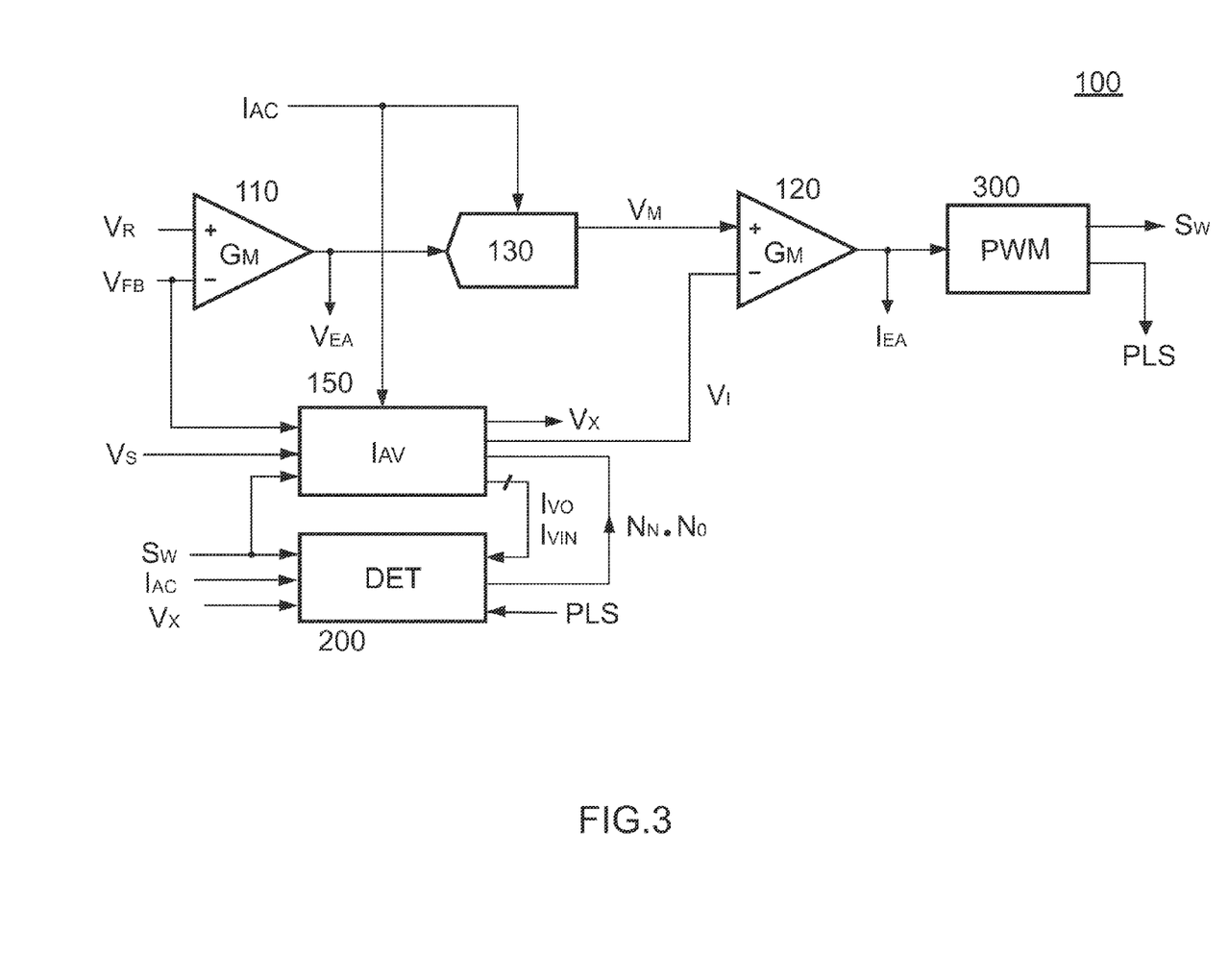
FIG. 3 is an exemplary embodiment of a control circuit of the PFC power converter in FIG. 2.

FIG. 3 is an exemplary embodiment of the PFC control circuit 100 according to the present invention. A transconductance amplifier ($G_M$) 110 is coupled to receive the signal $V_{FB}$ and a reference signal $V_R$ for generating a voltage loop signal $V_{EA}$. The capacitor 51 is coupled to the voltage loop signal $V_{EA}$ for the frequency compensation of the voltage loop. A multiplier-divider 130 generates a switching-current command signal $V_M$ in accordance with the voltage loop signal $V_{EA}$ and the input-voltage signal $I_{AC}$. The skill of the multiplier-divider 130 can be found in some prior arts, such as U.S. Pat. No. 7,057,440 titled "Multiplier-divider circuit for a PFC controller".

A synthesis circuit ($I_{AV}$) 150 is couple to receive the switching current signal $V_S$ for generating a synthesis current signal $V_I$ (also referred to as a current feedback signal). The switching current signal $V_S$ is only available during the on time $T_{ON}$ of the switching signal $S_W$. This is because when the power transistor 30 is turned off (shown in FIG. 2), the switching current signal $V_S$ has a zero value during the off time of the switching signal $S_W$, which is shown in FIG. 2A and FIG. 2B. The synthesis circuit 150 is utilized to sample the switching current signal $V_S$ and emulate the switching current $I_L$ during the discharge period of the inductor 20. Thus, the synthesis current signal $V_I$ includes the switching current signal $V_S$ in the on time of the switching signal $S_W$ and the discharge signal in the off time of the switching signal $S_W$. The signal $V_{FB}$, the input-voltage signal $I_{AC}$, and the switching signal $S_W$ are coupled to the synthesis circuit 150 for emulating the discharge signal. The synthesis circuit 150 further generates signals $V_X$, $I_{VO}$ and $I_{VIN}$, wherein the signals $I_{VO}$ and $I_{VIN}$ are coupled to a detection circuit (DET) 200. The signal $I_{VO}$ is correlated to the level of the output voltage $V_O$. The signal $I_{VIN}$ is correlated to the level of the input voltage $V_{IN}$. The signal (also referred to as a first signal) $V_X$ is correlated to the switching current signal $V_S$. The detection circuit 200 is coupled to receive the switching signal $S_W$, the input-voltage signal $I_{AC}$, and a pulse signal PLS for generating a control signal $N_N N_O$. The control signal $N_N N_O$ is coupled to modulate the discharge signal of the synthesis current signal $V_I$ in response to the signal $V_X$.

A transconductance amplifier ($G_M$) 120 receives the switching-current command signal $V_M$ and the synthesis current signal $V_I$ to generate a current loop signal $I_{EA}$. The capacitor 53 is coupled to the current loop signal $I_{EA}$ (shown in FIG. 2) for the frequency compensation of the current loop compensation. A pulse width modulation (PWM) circuit (PWM) 300 generates the switching signal $S_W$ in accordance with the current loop signal $I_{EA}$. The PWM circuit 300 further generates the pulse signal PLS coupled to the detection circuit 200.

Figure 4:
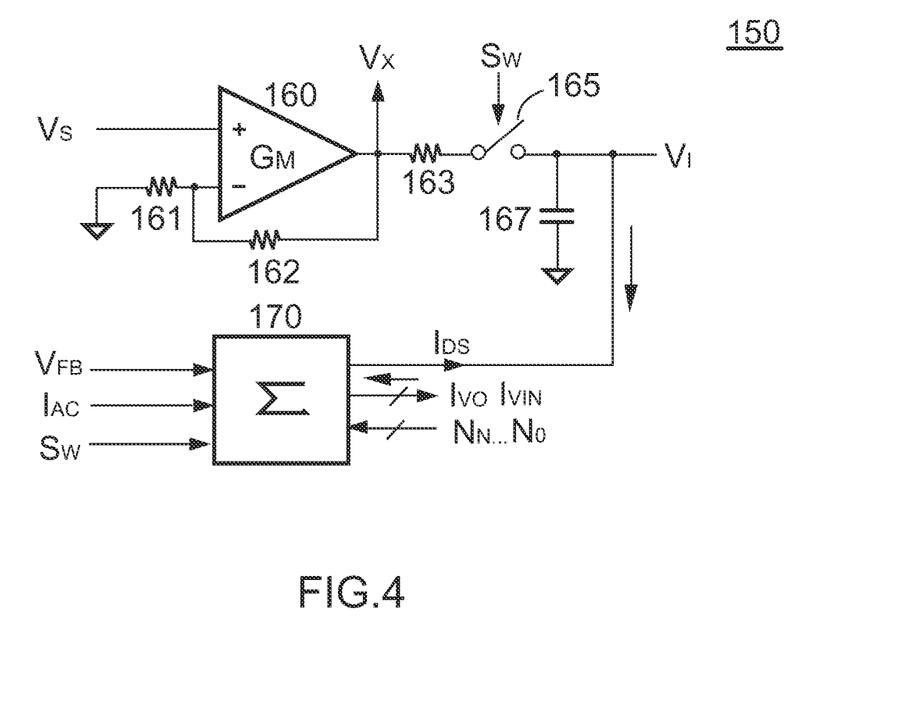
FIG. 4 is an exemplary embodiment of a synthesis circuit of the control circuit in FIG. 3.

FIG. 4 is an exemplary embodiment of the synthesis circuit 150 according to the present invention. A positive terminal of an amplifier 160 receives the switching current signal $V_S$, and a negative terminal thereof is coupled to a ground via a resistor 161. A resistor 162 is coupled between the negative terminal and an output of the amplifier 160. The amplifier 160 generates the signal $V_X$ at the output of the amplifier 160 in accordance with the switching current signal $V_S$. The amplifier 160 further generates the synthesis current signal $V_I$ by sampling the switching current signal $V_S$ via a resistor 163 and a switch 165 during the on time of the switching signal $S_W$. The synthesis current signal $V_I$ is hold in a capacitor 167 after the switch 165 is turned off. An emulation circuit 170 generates a discharge current $I_{DS}$ in response to the signals $V_{FB}$, the input-voltage signal $I_{AC}$, and the control signal $N_N N_O$. The discharge current $I_{DS}$ is coupled to discharge the capacitor 167 for emulating the discharge signal of the synthesis current signal $V_I$ during the off time of the switching signal $S_W$. In the embodiment, the amplifier 160, the resistors 161-163, the switch 165, and the capacitor 167 form a sample circuit. The sample circuit samples the switching current signal into the capacitor 167 during the on time of the switching signal The emulation circuit 170 further generates the signals $I_{VO}$ and $I_{VIN}$ coupled to the detection circuit 200.

The emulation circuit 170 is developed for generating the discharge current $I_{DS}$. The detail operation for the discharge (demagnetizing) of the inductor can be found in some prior arts, such as U.S. Pat. No. 7,471,523 titled "Method and apparatus for detecting demagnetizing time of magnetic device".

Equation (3) shows the discharge current $I_{DS}$.

$$T_{DS} = T_{ON} \times k \times \frac{V_{IN}}{(V_O - V_{IN})} \quad (3)$$

wherein k is a constant, which represents a slope of the discharge signal.

The discharge current $I_{DS}$ is correlated to the discharge time $T_{DS}$. The input-voltage signal $I_{AC}$ is correlated to the input voltage $V_{IN}$. The signal $V_{FB}$ is correlated to the output voltage $V_O$. The discharge current $I_{DS}$ associated with the capacitance of the capacitor 167 determines the discharge time $T_{DS}$.

Figure 5:
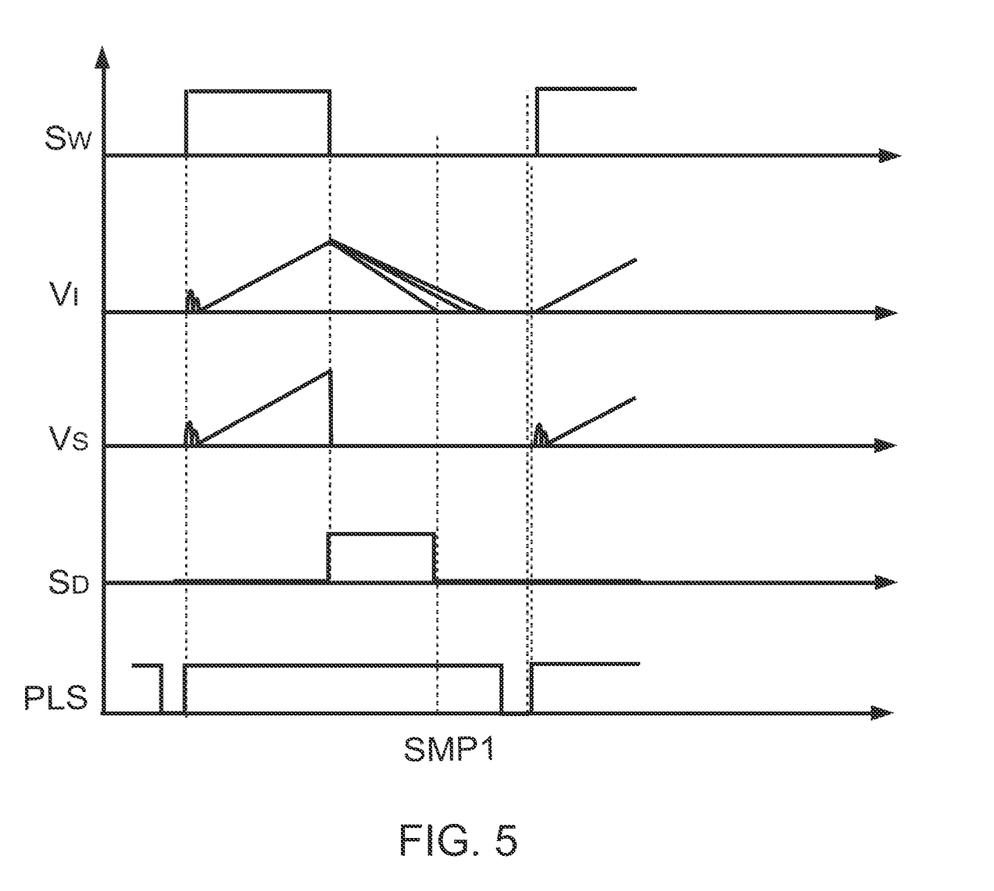
FIG. 5 shows waveforms of a synthesis current signal, a pulse signal, a switching current signal, a switching signal, and a signal of the power converter in FIG. 2 in a DCM operation.

FIG. 5 shows the waveforms of the synthesis current signal $V_I$, the pulse signal PLS, the switching current signal $V_S$, the switching signal $S_W$, and a signal $S_D$ operated in the DCM. The slope of the discharge signal of the synthesis current signal $V_I$ is modulated in accordance with the signal $S_D$ (a discharge signal developed in accordance with Equation (3)). The signal $S_D$ is enabled (logic-high) in response to the turned-off state of the switching signal $S_W$. The synthesis current signal $V_I$ will be discharged to a zero value when the signal $S_D$ is disabled (logic-low). A sample-signal SMP1 indicates the end of the discharge time $T_{DS}$ (the signal $S_D$ is disabled). If the synthesis current signal $V_I$ cannot be discharged to the zero, then the control signal $N_N N_O$ will be modulated to increase the discharge slope of the synthesis current signal $V_I$.

Figure 6:
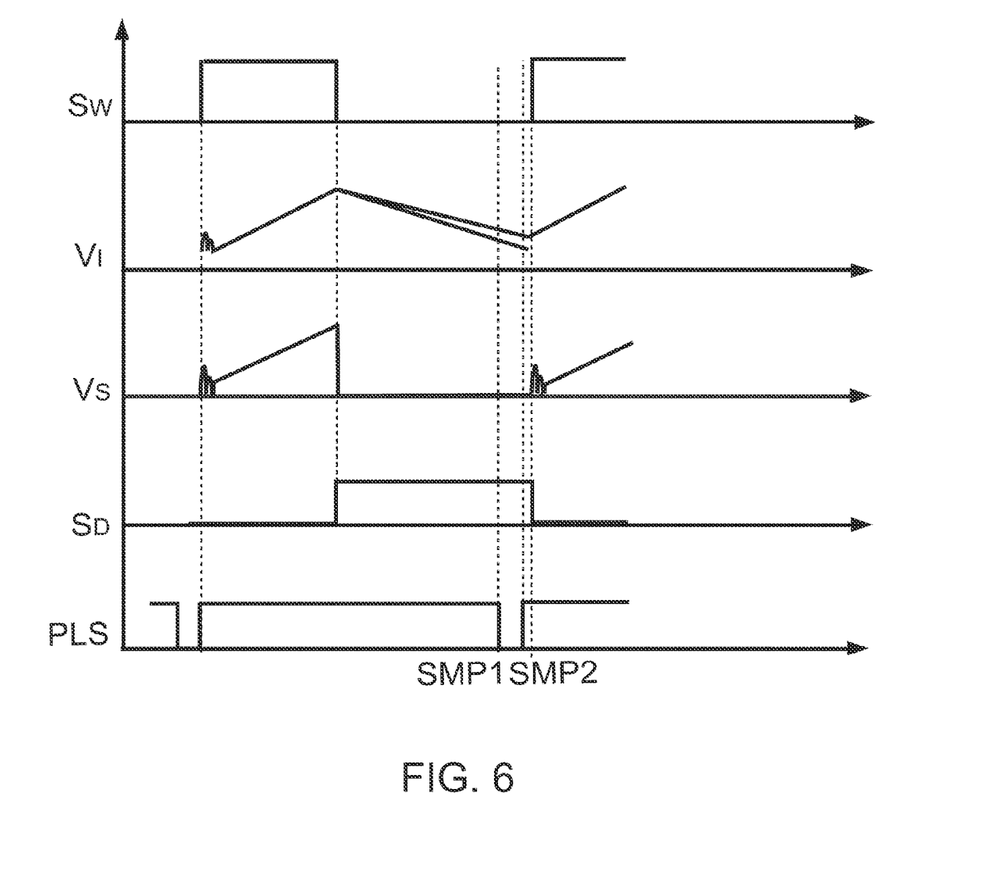
FIG. 6 shows the waveforms of a synthesis current signal, a pulse signal, a switching current signal, a switching signal, and a signal of the power converter in FIG. 2 in a CCM operation.

FIG. 6 shows the waveforms of the synthesis current signal $V_I$, the pulse signal PLS, the switching current signal $V_S$, the switching signal $S_W$, and the signal $S_D$ operated in the CCM. The slope of the discharge signal of the synthesis current signal $V_I$ is generated in accordance with the value by sampling the switching current signal $V_S$ (by a sample-signal SMP2). The sample-signal SMP2 is applied to sample the initial value of the switching current signal $V_S$ when the switching signal $S_W$ is turned on. A short time-delay is required to avoid the turned-on spike of the switching current signal $V_S$. The initial value of the switching current signal $V_S$ indicates the continuous current $I_1$ shown in FIG. 2B. According to Equation (3), the signal $S_D$ is still enabled when the switching signal $S_W$ is turned on in the CCM operation. The signal $S_D$ will be disabled in response to the turned-on state of the switching signal $S_W$. The synthesis current signal $V_I$ will be discharged to the initial value of the switching current signal $V_S$ in response to the pulse signal PLS. The pulse signal PLS is developed to indicate the end of the switching cycle. The sample-signal SMP1 is utilized to sample the value of the synthesis current signal $V_I$ at the end of the switching cycle. If the sampled value of the synthesis current signal $V_I$ is not equal to the initial value of the switching current signal $V_S$, then the control signal $N_N N_O$ will be modulated to change the discharge slope of the synthesis current signal $V_I$.

Figure 7:
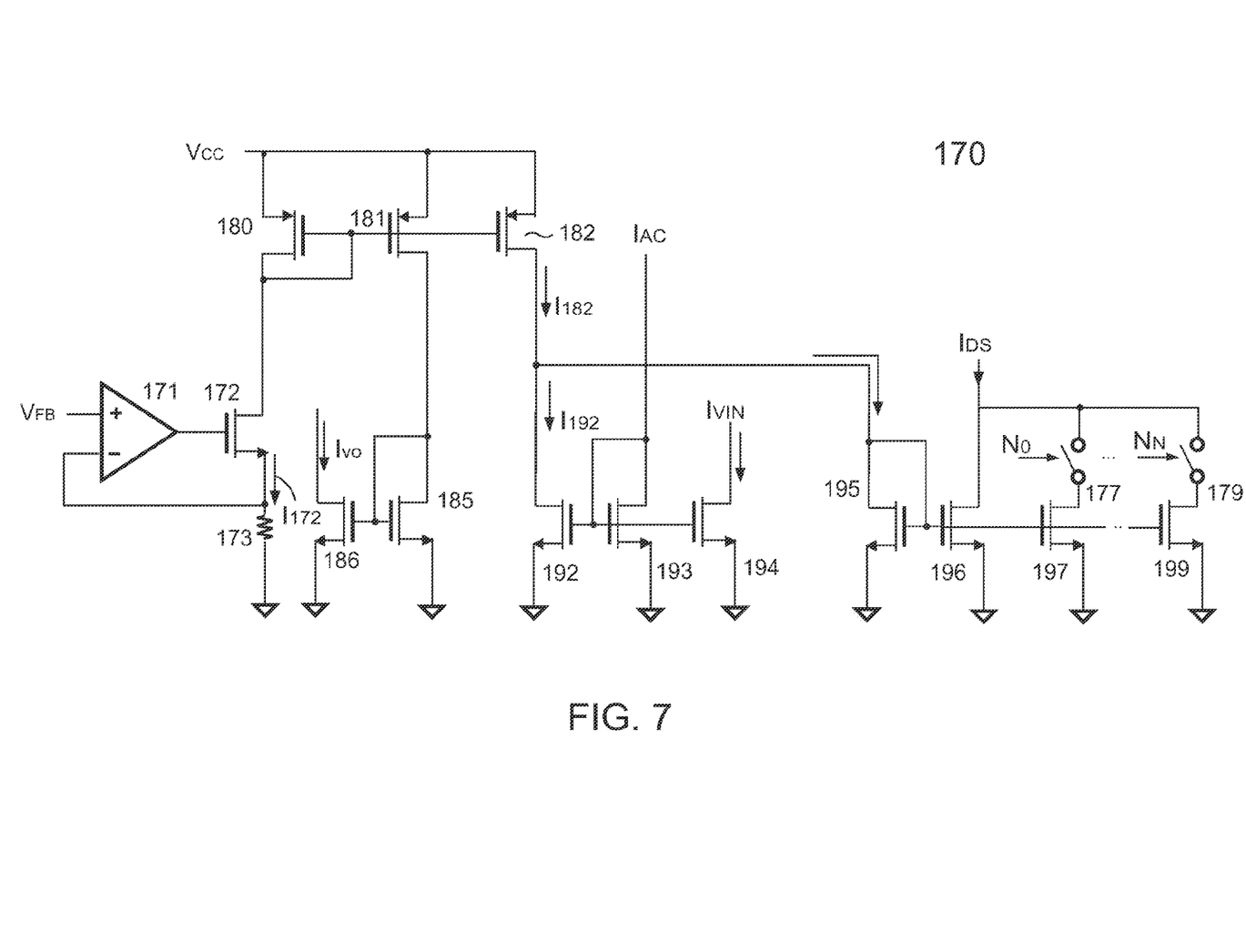
FIG. 7 is an exemplary embodiment of an emulation circuit of the synthesis circuit in FIG. 4.

FIG. 7 is an exemplary embodiment of the emulation circuit 170 according to the present invention. An amplifier 171, a resistor 173, and a transistor 172 develop a V-to-I converter for generating a current $I_{172}$ in accordance with the signal $V_{FB}$. Transistors 180, 181, 182, 185, and 186 form a first current mirror to generate the signal $I_{VO}$ and a current $I_{182}$. Transistors 192, 193, and 194 form a second current mirror to generate the signal $I_{VIN}$ and a current $I_{192}$. Transistors 195 and 196~199 develop a third current mirror generates the discharge current $I_{DS}$ in response to the current $I_{182}$ and the current $I_{192}$. The discharge current $I_{DS}$ is modulated by the control signal $N_N N_O$ via switches 177~179.

$$V_{FB} = V_O \times \frac{R_{42}}{R_{41} + R_{42}} \quad (4)$$

$$I_{182} = \left\{ \left[ V_O \times \frac{R_{42}}{R_{41} + R_{42}} \right] \div R_{173} \right\} \times k1$$

$$I_{192} = I_{AC} \times k2$$

$$I_{DS} = I_{182} - I_{192}$$

$$I_{AC} = \frac{V_{IN}}{R_{50}}$$

(Shown in FIG. 2)

where $R_{41}$ is the resistance of the resistor 41. $R_{42}$ is the resistance of the resistor 42. $R_{50}$ is the resistance of the resistor 50. $R_{173}$ is the resistance of the resistor 173. k1, k2 and $K_N$ are current mirror ratio;

The discharge current $I_{DS}$ shown in Equation (4) can be expressed as Equation (5).

$$I_{DS} = K_N \times \left\{ \left[ V_O \times \frac{R_{42}}{R_{41} + R_{42}} \right] \div R_{173} \right\} \times k1 - \left( \frac{V_{IN}}{R_{50}} \times k2 \right) \quad (5)$$

where k1, k2 and $K_N$ are current mirror ratios;

The constant $K_N$ is determined by the control signal $N_N N_O$ via the switches 177~179. Changing the constant $K_N$ will change the slope of the discharge current $I_{DS}$.

The charge slope of the switching current signal $V_S$ should be equal to the discharge slope of the synthesis current signal $V_I$, which is shown in Equation (6).

$$\left( \frac{V_{IN}}{L_{20}} \times T_{ON} \right) \times R_{35} \times k3 = \frac{I_{DS}}{C_{167}} \times T_{DS} \quad (6)$$

According to Equation (5), Equation (6) can be rewritten as Equation (7) and Equation (8), $$\left( \frac{V_{IN}}{L_{20}} \times R_{35} \times k3 \right) \times T_{ON} = \quad (7)$$

$$\frac{K_N}{C_{167}} \times \left\{ \left[ V_O \times \frac{R_{42}}{R_{173} \times (R_{41} + R_{42})} \right] \times k1 - \left( \frac{V_{IN}}{R_{50}} \times k2 \right) \right\} \times T_{DS}$$

$$V_{IN} \times k_A \times T_{ON} = (V_O \times k_B - V_{IN} \times k_C) \times T_{DS} \quad (8)$$

wherein $L_{20}$ is the inductance of the inductor 20. $C_{167}$ is the capacitance of the capacitor 167.

$$k_A = \left( \frac{1}{L_{20}} \times R_{35} \times k3 \right)$$

$$k_B = \frac{K_N}{C_{167}} \times \frac{R_{42}}{R_{173} \times (R_{41} + R_{42})} \times k1$$

$$k_C = \frac{K_N}{R_{50}} \times k2$$

set $k_B = k_C$; and $k = \frac{k_A}{k_B}$

Equation (8) can be rewritten as Equation (3). Changing the constant $K_N$ will change the constant k.

$$T_{DS} = T_{ON} \times k \times \frac{V_{IN}}{(V_O - V_{IN})}$$

Figure 8:
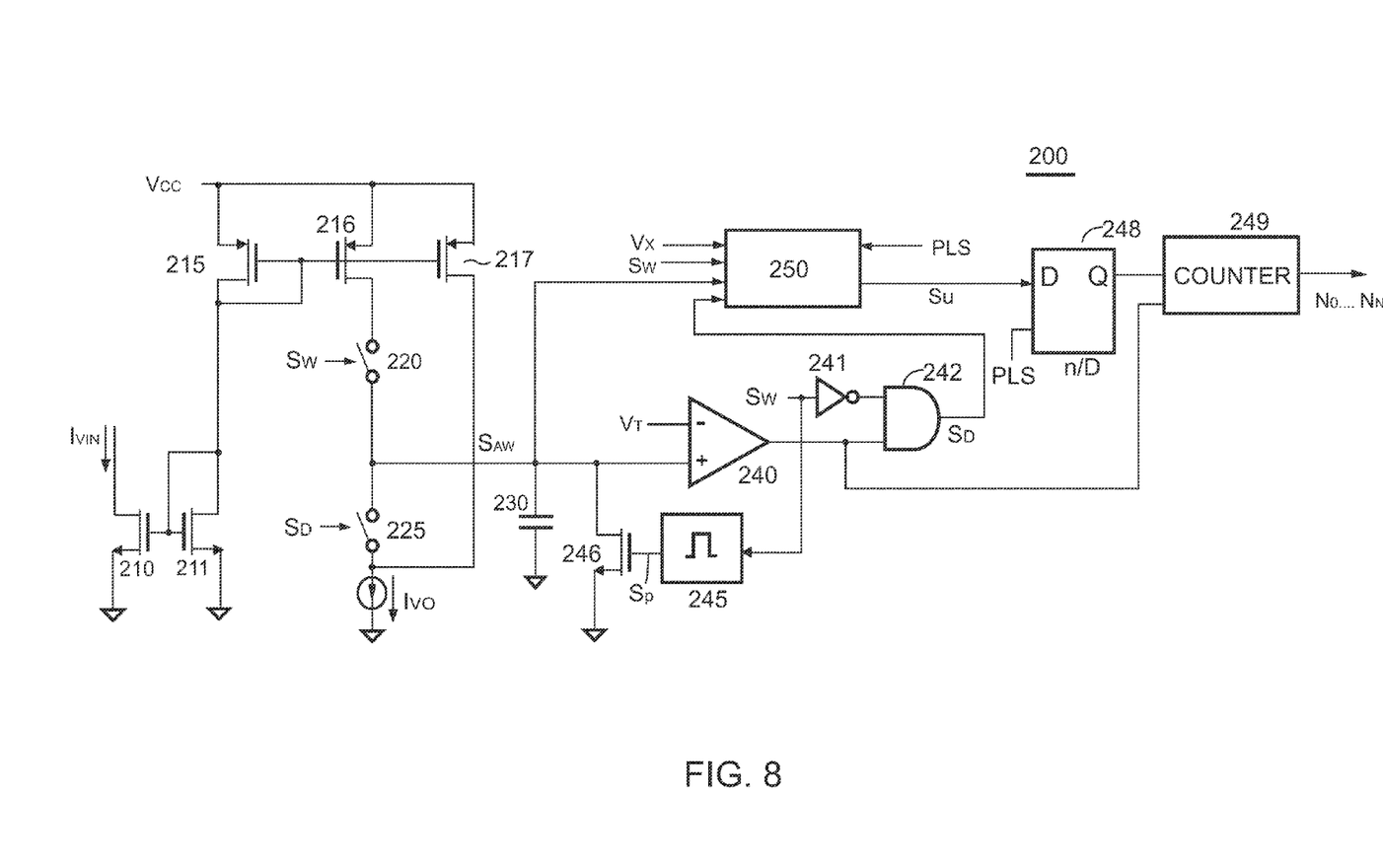
FIG. 8 is an exemplary embodiment of a detection circuit of the control circuit in FIG. 3.

FIG. 8 is an exemplary embodiment of the detection circuit 200 according to the present invention. The detection circuit 200 is developed to generate the control signal $N_N N_O$ and detect the operation of the DCM or CCM. The detection circuit 200 will determine the sample-signals SMP1 and SMP2 (shown in FIG. 5 and FIG. 6). The signal $I_{VIN}$ is coupled to charge a capacitor 230 via transistors 210, 211, 215, and 216 and a switch 220 during on time of the switching signal $S_W$. When the switching signal $S_W$ is turned off, the signal $I_{VO}$ and the signal $I_{VIN}$ are coupled to discharge the capacitor 230 via a switch 225 and a transistor 217 during the discharge time $T_{DS}$. The discharge signal $S_D$ controls the switch 225. The enabling of the discharge signal $S_D$ indicates the discharge time $T_{DS}$. The switching signal $S_W$ controls the switch 220. A circuit 245 generates a pulse signal $S_P$ according to the rising edge of the switching signal $S_W$, and the pulse signal $S_P$ is coupled to discharge the capacitor 230 through a transistor 246. A saw signal $S_{AW}$ is thus generated in the capacitor 230 in response to the switching signal $S_W$ and the discharge signal $S_D$.

A comparator 240 is utilized to compare the saw signal $S_{AW}$ with a threshold $V_T$. The output of the comparator 240 is coupled to enable the discharge signal $S_D$ via an AND gate 242 and an inverter 241 when the switching signal $S_W$ is turned off and the saw signal $S_{AW}$ is higher than the threshold $V_T$. The discharge signal $S_D$, the switching signal $S_W$, the signal $V_X$, and the pulse signal PLS are coupled to a circuit 250 for generating an up-count signal $S_U$. The up-count signal $S_U$ and the pulse signal PLS are coupled to a flip-flop 248 for generating an up/down signal U/D. The rising edge of the pulse signal PLS is applied to enable of the switching signal $S_W$ and latch the status of the up-count signal $S_U$. The up/down signal U/D is coupled to a counter 249 for generating the control signal $N_N N_O$ in response to the falling edge of the switching signal $S_W$. The control signal $N_N N_O$ will be increased to change the slope of the discharge signal of the synthesis current signal $V_I$ when the up/down signal U/D is enabled (logic-high). Equation (9) shows the operation of the detection circuit 200.

$$(I_{VIN} \times ka) \times T_{ON} = (I_{VO} - I_{VIN} \times kb) \times T_{DS} \qquad (9)$$

Equation (9) can be expressed as Equation (10).

$$(V_{IN} \times kc) \times T_{ON} = (V_O \times kd - V_{IN} \times ke) \times T_{DS} \qquad (10)$$

set the kd=ke and $$k = \frac{kc}{kd},$$

then Equation (10) will be same as Equation (7).
where ka, kb, kc, kd, ke are the constant determined by the circuit parameters.

Figure 9:
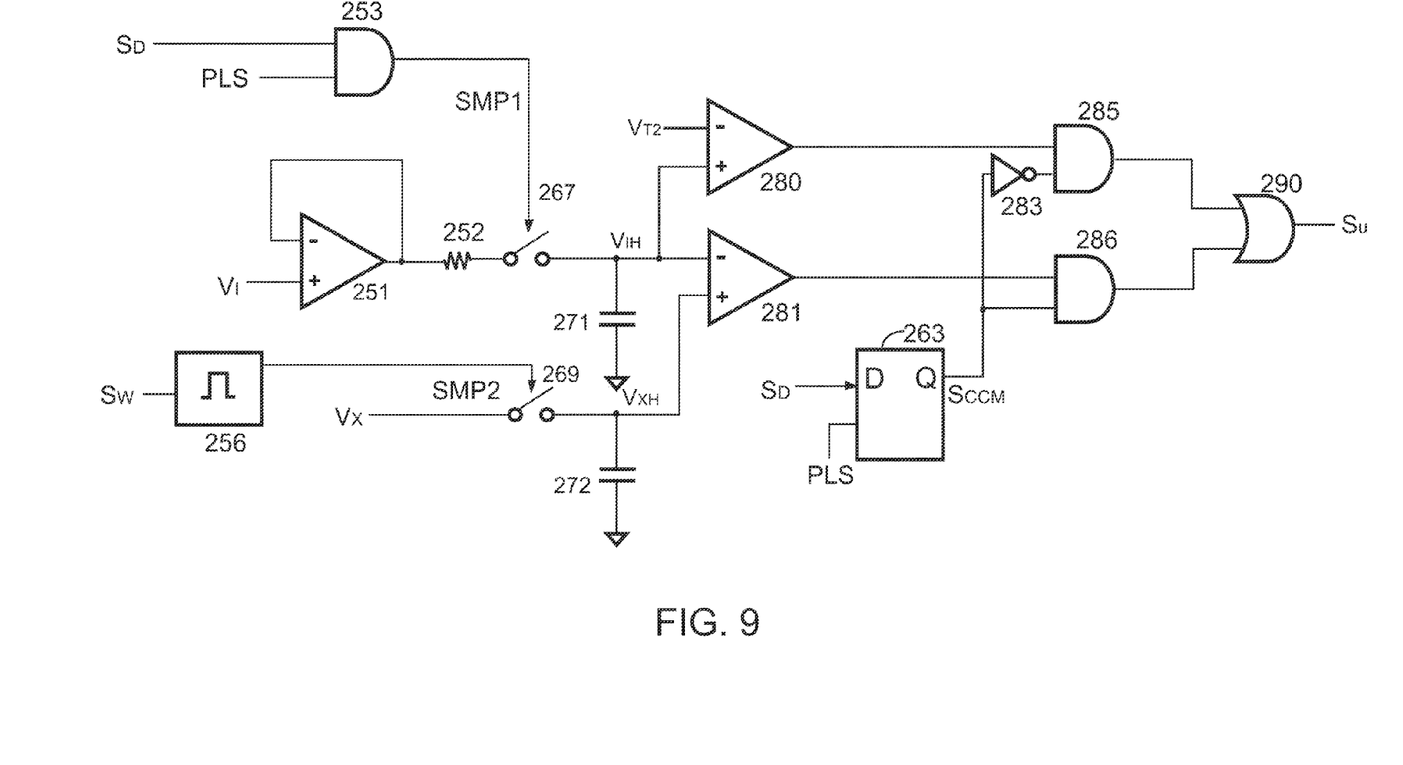
FIG. 9 is an exemplary embodiment of a circuit of the detection circuit in FIG. 8.

FIG. 9 is an exemplary embodiment of the circuit 250 according to the present invention. The circuit is used for generating a CCM signal $S_{CCM}$ (mode signal) when the switching current $I_L$ is operated in CCM and generating the up-count signal $S_U$. The discharge signal $S_D$ and the pulse signal PLS are coupled to generate the sample-signal SMP1 via an AND gate 253. The sample-signal SMP1 is coupled to sample the synthesis current signal $V_I$ into a capacitor 271 through a buffer 251, a resistor 252, and a switch 267 for generating a signal $V_{IH}$. The rising edge of the switching signal $S_W$ generates a pulse sample-signal SMP2 via a pulse generator 256. The sample-signal SMP2 is coupled to sample the signal $V_X$ into a capacitor 272 via a switch 269 for generating a signal $V_{XH}$. The signal $V_X$ is correlated to the switching current signal $V_S$. The discharge signal $S_D$ and the pulse signal PLS are coupled to a flip-flop 263 to generate the CCM signal $S_{CCM}$. If the discharge signal $S_D$ (discharge time $T_{DS}$) is still enable (available) in response to the rising edge of the pulse signal PLS (the start of the next switching cycle), then it indicates the CCM operation. The CCM signal $S_{CCM}$ is coupled to a DCM/CCM multiplexer for generating the up-count signal SU. An inverter 283, an OR gate 290, and AND gates 286 and 285 develop the DCM/CCM multiplexer.

The signal $V_{IH}$ and a threshold $V_{T2}$ are coupled to a comparator 280 to check if the signal $V_{IH}$ is higher than a zero value when the switching current $I_L$ is operated in the DCM. The output of the comparator 280 is coupled to the input of the AND gate 285. The signal $V_{IH}$ and the signal $V_{XH}$ are coupled to a comparator 281 to check if the signal $V_{IH}$ is higher than the signal $V_{XH}$ (the initial value of the signal $V_S$) when the switching current $I_L$ is operated in the CCM. The output of the comparator 281 is coupled to the input of the AND gate 286.

Figure 10:
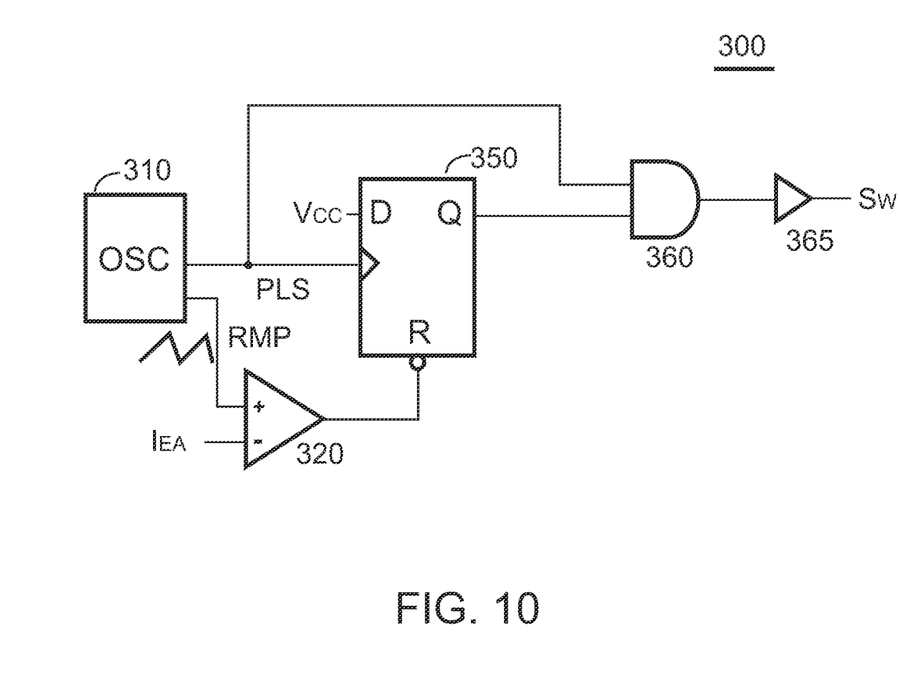
FIG. 10 shows an exemplary embodiment of a PWM circuit of the control circuit in FIG. 3.

FIG. 10 shows an exemplary embodiment of the PWM circuit 300. An oscillator (OSC) 310 generates the pulse signal PLS and a ramp signal RMP. The pulse signal PLS is coupled to generate the switching signal $S_W$ and provide a dead-time for the switching signal $S_W$. The ramp signal RMP is coupled to compare with the signal $I_{EA}$ for the reset of a flip-flop 350 via a comparator 320. The flip-flop 350 generates the switching signal $S_W$ through an AND gate 360 and an output buffer 365.

Figure 11:
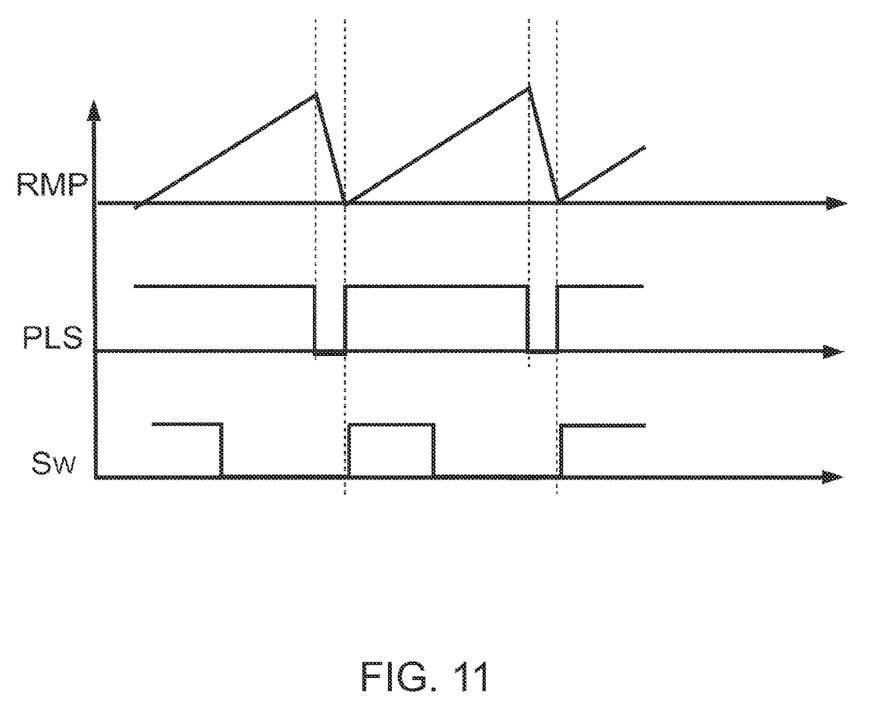
FIG. 11 shows waveforms of a ramp signal, a pulse signal, and a switching signal of the PWM circuit in FIG. 10.

FIG. 11 shows the waveforms of the ramp signal RMP, the pulse signal PLS, and the switching signal $S_W$.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control circuit of a power converter comprising:
    a pulse width modulation (PWM) circuit generating a switching signal for switching an inductor and generating a switching current of the inductor in response to a current feedback signal;
    a sample circuit coupled to sample a switching current signal into a capacitor during an on time of the switching signal; and
    an emulation circuit generating a discharge current couple to discharge the capacitor during an off time of the switching signal for generating the current feedback signal;
    wherein the switching current signal is correlated to the switching current of the inductor, and a discharge current is generated in response to an input voltage of the inductor, an output voltage of the power converter, and the on time of the switching signal.

2. The control circuit as claimed in claim 1, wherein the emulation circuit generates a discharge time signal in accordance with the input voltage of the inductor, the output voltage of the power converter, and the on time of the switching signal, and the discharge current is coupled to discharge the capacitor in response to the discharge time signal.

3. The control circuit as claimed in claim 1, further comprising:
a detection circuit generating a mode signal for indicating a continuous current mode (CCM) or discontinuous current mode (DCM) operation, wherein the mode signal is used for the emulation circuit to generate the discharge current.

4. The control circuit as claimed in claim 3, wherein the detection circuit generates a control signal for modulating a slope of the discharge current.

5. The control circuit as claimed in claim 4, wherein the detection circuit comprises:
a counter for generating the control signal.

6. The control circuit as claimed in claim 1, wherein a slope of the discharge current is modulated in accordance with the input voltage of the inductor, the output voltage of the power converter, and the on time of the switching signal.

7. The control circuit as claimed in claim 1, wherein a slope of the discharge current is modulated in accordance with an initial value of the switching current signal.

8. The control circuit as claimed in claim 1, wherein the sample circuit comprises:
an amplifier receiving the switching current signal and generating a first signal in accordance with the switching current signal;
a resistor and a switch sampling the switching current signal to generate the current feedback signal; and
wherein the capacitor holding the current feedback signal after the switch is turned off.

9. A method for controlling a power converter comprising:
generating a switching signal for switching an inductor and generating a switching current of the inductor in response to a current feedback signal; and
sampling a switching current signal into a capacitor during an on time of the switching signal;
generating a discharge current to discharge the capacitor during an off time of the switching signal for generating an emulated switching current signal;
wherein the switching current signal is correlated to the switching current of the inductor, the discharge current is generated in response to an input voltage of the inductor, an output voltage of the power converter, and the on time of the switching signal, and the emulated switching current signal is coupled to generate the current feedback signal.

10. The method as claimed in claim 9 further comprising generating a discharge time signal in accordance with the input voltage of the inductor, the output voltage of the power converter and the on time of the switching signal, wherein the discharge current is coupled to discharge the capacitor in response to the discharge time signal.

11. The method as claimed in claim 9 further comprising generating a mode signal for indicating a continuous current mode (CCM) or discontinuous current mode (DCM) operation, wherein the mode signal is used to generate the discharge current.

12. The method as claimed in claim 9, wherein a slope of the discharge current is modulated in accordance with the input voltage of the inductor, the output voltage of the power converter, and the on time of the switching signal.

13. The method as claimed in claim 9, wherein the slope of the discharge current is modulated in accordance with an initial value of the switching current signal.

14. The method as claimed in claim 9 further comprising generating a control signal for modulating the slope of the discharge current.

15. The method as claimed in claim 14, wherein the control signal is generated by a counter.

16. The method as claimed in claim 9, wherein the emulated switching current signal and a ramp signal are used to generate the current feedback signal.

* * * * *